United States Patent
Cottet et al.

(10) Patent No.: US 11,873,076 B2
(45) Date of Patent: Jan. 16, 2024

(54) AIRCRAFT TURBINE ENGINE COMPRISING VARIABLE PITCH PROPELLER BLADES

(71) Applicant: SAFRAN AIRCRAFT ENGINES, Paris (FR)

(72) Inventors: Clément Cottet, Moissy-Cramayel (FR); Vivien Mickaël Courtier, Moissy-Cramayel (FR); Vincent Joudon, Moissy-Cramayel (FR); Arnaud Langlois, Moissy-Cramayel (FR); Régis Eugène Henri Servant, Moissy-Cramayel (FR); Laurent Jablonski, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/006,128

(22) PCT Filed: Jul. 15, 2021

(86) PCT No.: PCT/FR2021/051312
§ 371 (c)(1),
(2) Date: Jan. 19, 2023

(87) PCT Pub. No.: WO2022/018355
PCT Pub. Date: Jan. 27, 2022

(65) Prior Publication Data
US 2023/0286644 A1    Sep. 14, 2023

(30) Foreign Application Priority Data

Jul. 24, 2020 (FR) .................................. 2007809
Jul. 24, 2020 (FR) .................................. 2007812
Mar. 15, 2021 (FR) .................................. 2102546

(51) Int. Cl.
*B64C 11/30* (2006.01)
*B64C 11/06* (2006.01)
(Continued)

(52) U.S. Cl.
CPC .............. *B64C 11/30* (2013.01); *B64C 11/06* (2013.01); *F01D 5/30* (2013.01); *F01D 7/00* (2013.01); *F05D 2260/70* (2013.01)

(58) Field of Classification Search
CPC ........ F04D 29/323; B64C 11/30; B64C 11/06
See application file for complete search history.

(56) References Cited

U.S. PATENT DOCUMENTS 1,573,000 A * 2/1926 Heath .................... B64C 11/06
                                                    416/221
2,017,505 A * 10/1935 Meon .................... B64C 11/06
                                                    416/147

(Continued)

FOREIGN PATENT DOCUMENTS

FR   3005683 A1   11/2014
GB   2192943 A *  1/1988  ............. B64C 11/06

OTHER PUBLICATIONS

International Preliminary Report on Patentability received for PCT Patent Application No. PCT/FR2021/051312, dated Feb. 2, 2023, 13 pages (5 pages of English Translation and 8 pages of Original Document).

(Continued)

*Primary Examiner* — Justin D Seabe
(74) *Attorney, Agent, or Firm* — WOMBLE BOND DICKINSON (US) LLP

(57) ABSTRACT

An assembly including a propeller blade and a pitch adjustment system for setting the pitch of the blade. A root of the blade has a bulb and the pitch adjustment system for setting the pitch of the blade includes a cup having an upper (Continued)

opening; —a retaining ring, which extends around the bulb, is restricted at least in terms of axial movement towards the opening relative to the cup and has a bearing face to inhibit axial movement of the root towards the opening The pitch adjustment system being further includes a lower seat for the root to engage the cup, the seat and/or the retaining ring being mounted so as to be capable of axial translation relative to the cup by at least one clamping mechanism.

18 Claims, 10 Drawing Sheets

(51) Int. Cl.
*F04D 29/32* (2006.01)
*F01D 5/30* (2006.01)
*F01D 7/00* (2006.01)

(56) References Cited

U.S. PATENT DOCUMENTS

| | | | | |
|---|---|---|---|---|
| 2,436,612 | A * | 2/1948 | Sheets | B64C 11/06 416/207 |
| 5,263,898 | A * | 11/1993 | Elston, III | B64C 11/06 416/129 |
| 7,845,910 | B2 * | 12/2010 | Talasco | F16C 33/513 416/239 |
| 8,382,442 | B2 * | 2/2013 | Boston | B64C 11/06 416/207 |
| 2018/0290728 | A1 | 10/2018 | Violette et al. | |

OTHER PUBLICATIONS

International Search Report and Written Opinion received for PCT Application No. PCT/FR2021/051312, dated Nov. 11, 2021, 15 pages (7 pages of English Translation and 8 pages of Original Document.

* cited by examiner

AIRCRAFT TURBINE ENGINE COMPRISING VARIABLE PITCH PROPELLER BLADES

TECHNICAL FIELD OF THE INVENTION

The present invention relates to the field of aircraft turbine engines and in particular to the propulsion propellers of these turbine engines which comprise variable pitch vanes.

TECHNICAL BACKGROUND

An aircraft turbine engine propeller can be ducted, as in the case of a fan for example, or un-ducted, as in the case of an open-rotor architecture for example.

A propeller comprises vanes which may be pitch variable. The turbine engine then comprises a mechanism allowing for changing the pitch angle of the vanes in order to adapt the thrust generated by the propeller to different phases of flight.

The design of a propeller vane involves several disciplines with generally conflicting objectives. It must allow optimal aerodynamic performance (i.e. provide a thrust while maximising the efficiency), guarantee a mechanical strength of the vane (i.e. withstand the mechanical constraints resulting from static and dynamic loadings) while limiting the mass and the acoustic signature. In particular, the improvement in the aerodynamic performance of the propeller tends towards an increase of the BPR (By Pass Ratio), which translates into an increase in its external diameter and therefore in the span of the vanes.

At the same time, in some turbine engine architectures, the engine is started at a very open pitch, referred to as feathering. In fact, this starting position allows the power to be consumed by the torque, which ensures the machine safety by guaranteeing low propeller speeds. More precisely, according to simple considerations, the power is proportional to the product of the speed and the torque. However, the torque increases with the angle of incidence, which can be increased by means of the pitch. Indeed, the person skilled in the art in aerodynamics understands that the resulting force on a blade profile is, to a first approximation, perpendicular to the chord and can be broken down into two components: the thrust along the engine axle and the drag of the blade in the plane of the propeller. Thus, as the pitch of the vanes increases, the resulting force displaces towards the propeller plane, increasing the drag of the aerodynamic profile and decreasing the thrust.

Therefore, in the case of feathered start, the thrust generated by the propeller is zero, the torque is maximum and the speed is minimum. However, the incidence becomes so high that the blades are subjected to a turbulent, highly lifted aerodynamic flow which generates a strong vibratory excitation. This excitation is both broadband due to the small vortexes in the lifted area, but also intense at certain specific frequencies due to the large Karman re-circulations which cause the aerodynamic force to oscillate significantly. In particular, on large chord and large span blades that generate a lot of drag, this force is intense even though the speed is not high.

In the current technique, it is common practice to attach a vane to its support with an attachment referred to as broached. The vane comprises a root which has a general dovetail shape and which is intended to be engaged in a form-fitting manner in a pocket of the support, this pocket being conventionally produced by broaching.

For a blade with a broached attachment, this aerodynamic force is so intense that it can cause rigid solid movements of the vane root in its pocket, which is similar to swivelling. During a feathered start, the reduced speed of the fan does not allow a sufficient centrifugal force to be generated to prevent these movements induced by the aerodynamical force. This results in frictional damage to the blade and the shim interposed between the root and the bottom of the pocket in just a few cycles. For the same reasons, this problem may arise in a wind milling training situation following an engine failure, as the variable pitch vanes are generally equipped with a feathering system.

In addition, an intense vibration excitation can also occur at much higher rotational speeds on the un-ducted architectures due to the effects of installation of the engine on the aircraft and the direction of the upstream infinite flow. Indeed, an un-ducted engine is influenced by the ground and the fuselage, which causes a distortion in the propeller feed, in flow speed, according to the engine azimuths. This results in a vibratory response of the propeller vanes on the first engine orders 1N, 2N and 3N (possibly higher). On the other hand, in the absence of an air inlet sleeve, the direction of the air flowing through the blades is not parallel to the engine axle. This sideslip angle causes forces referred to as "1P" which cause a vibratory response of the propeller vanes on the engine order 1N. Similarly, these forces 1P can also occur during the climb or approach phases of the aircraft as the air flows through the blades at an angle of incidence. These high rotational speed vibratory excitations can cause the same frictional damage discussed above if the attachment of the vane is not suitable.

For all of these reasons, the broached attachment is not currently a viable solution for variable pitch, large chord and large span propeller vanes.

There is therefore a need for an attachment technology of a variable pitch propeller vane that allows to limit the vane swivelling during all phases of flight that are likely to excite the vibratory modes of the vane.

In addition, it is also known to envelop the root of the vane in a barrel that matches the shape of the root, usually a metal barrel. In particular, such a barrel allows to ensure the connection between the vane root and the internal ring of a guide bearing to allow the angular pitch setting of the vane in relation to the hub. Such a barrel is attached to the vane root with great care to limit as much as possible the creation of a swivelling between the vane and the barrel.

However, regardless of the precautions taken, it is often observed that the vane can oscillate with some deflection in the barrel. There is therefore a need to ensure that the swivelling of the vane is limited as much as possible in relation to the internal guide bearing ring.

SUMMARY OF THE INVENTION

The invention proposes an assembly comprising a propeller vane and a system for setting the pitch of the vane, for an aircraft turbine engine, the vane having a root extending from an upper end connected to a blade of the vane to a free lower end, the root having a bulged stretch, referred to as "bulb", the system for setting the pitch of the vane about a pitch axis comprising:
- a cup which is radially delimited by an annular wall extending around the pitch axis, the cup comprising a lower bottom closed by a bottom wall and an upper opening through which the bulb is intended to be inserted axially into the cup;

an annular retention ring extending around the bulb, the retention ring being at least limited in axial displacement towards the opening with respect to the cup, the retention ring having an annular bearing surface face which restricts the passage cross-section of the opening and which is intended to be in axial contact with an upper face of the bulb to block the axial displacement of the root towards the opening.

The assembly according to the invention is characterised in that it comprises a lower seat carried by a part distinct from the retention ring by means of which the root is axially supported in the cup in the direction of the bottom, the seat and/or the retention ring being mounted movable in axial translation with respect to the cup by means of at least one clamping mechanism in order to allow the bulb to be axially clamped between the seat and the bearing surface face of the retention ring.

This ensures that the root is attached to the cup without clearance, thus preventing the swivelling of the vane in the cup. This differs in particular from the embodiments of the prior art in which the root is enveloped in a barrel fitted.

According to another characteristic of the assembly produced according to the teachings of the invention, the bearing surface face of the retention ring is directly in contact with the bulb and the seat is directly in contact with the root.

This ensures that the root cannot move relative to the bearing surface face and the seat due to the absence of element fitted to the root, in particular due to the absence of barrel enveloping the root.

According to another characteristic of the assembly produced according to the teachings of the invention, the bearing surface face of the retention ring has a shape complementary to that of the upper face of the bulb.

This ensures a better distribution of the force over a larger surface of the bulb.

According to another characteristic of the assembly produced in accordance with the teachings of the invention, the upper face of the bulb has a generally frustoconical shape.

This allows to ensure both an axial and radial maintain of the bulb in the cup.

According to another characteristic of the assembly produced according to the teachings of the invention, the retention ring is produced of several sectors.

According to another characteristic of the assembly produced according to the teachings of the invention, the retention ring is made of at least three sectors.

The production of the retention ring in several sectors allows to simplify the mounting of the root in the cup.

According to another characteristic of the assembly produced in accordance with the teachings of the invention, the bottom wall is configured to cooperate in a form-fitting manner with a free end of the root so that the cup is secured in rotation with the root about the pitch axis.

According to another characteristic of the assembly produced according to the teachings of the invention, the pitch setting system further comprises:
 a lower rolling guide bearing extending around the pitch axis and mounted around a lower portion of the annular wall,
 an upper rolling guide bearing extending around the pitch axis and mounted around an upper portion of the annular wall.

According to another characteristic of the assembly produced according to the teachings of the invention, at least one of the guide bearings has its internal ring integrated into the cup.

According to another characteristic of the assembly produced in accordance with the teachings of the invention, the seat is mounted movable in axial translation in the cup by means of at least one clamping mechanism.

According to another characteristic of the assembly produced in accordance with the teachings of the invention, each clamping mechanism is formed by an axial screw which is received in a threading complementary of the seat, a lower end of the screw being supported axially against a face of the cup turned towards the opening.

According to another characteristic of the assembly produced in accordance with the teachings of the invention, the clamping mechanism is formed by an annular clamping ring which surrounds the seat and which is in axial support against an annular face of the cup turned towards the opening, the clamping ring comprising an internal thread cooperating with an annular external thread secured axially to the seat, one of the external thread or the clamping ring being blocked in rotation with respect to the cup.

According to another characteristic of the assembly produced according to the teachings of the invention, the external thread is produced integral with a seat ring carrying the seat.

According to another characteristic of the assembly produced in accordance with the teachings of the invention, the retention ring is mounted movable in axial translation in the cup by means of at least one clamping mechanism.

According to another characteristic of the assembly produced in accordance with the teachings of the invention, the clamping mechanism comprises wedges which are distributed around the retention ring and which are interposed between a frustoconical face for supporting the annular wall of the cup turned towards the bottom and a peripheral stop face of the retention ring.

According to another characteristic of the assembly produced in accordance with the teachings of the invention, the clamping mechanism comprises a clamping ring which is screwed into the cup and which has a frustoconical annular face which bias the wedge in order to cause an axial clamping towards the bottom of the cup of the retention ring against the bulb.

According to another characteristic of the assembly produced according to the teachings of the invention, the retention ring is equipped on its periphery with external dog teeth which cooperate with complementary internal dog teeth of the annular wall of the cup to block the axial displacement of the retention ring towards the opening.

According to another characteristic of the assembly produced according to the teachings of the invention, the retention ring is produced integrally with the cup.

According to another characteristic of the assembly produced according to the teachings of the invention, the seat is mounted axially stationary with respect to the cup.

According to another characteristic of the assembly produced according to the teachings of the invention, a setting shim is interposed axially between the cup and the seat.

According to another characteristic of the assembly produced according to the teachings of the invention, the seat is produced integrally with the cup.

BRIEF DESCRIPTION OF THE FIGURES

Further characteristics and advantages of the invention will become apparent from the following detailed description, for the understanding of which reference is made to the attached drawings in which.

DETAILED DESCRIPTION OF THE INVENTION

In the following description, elements with an identical structure or similar functions will be referred to by a same reference.

In the remainder of the description, an axial orientation along the pitch axis "A" of the vane is adopted, from the bottom, near the root of the vane, upwards, near the free end of the vane. Radial directions extending orthogonally to the pitch axis from the inside, close to the pitch axis, outwards are also adopted.

Figure 1:
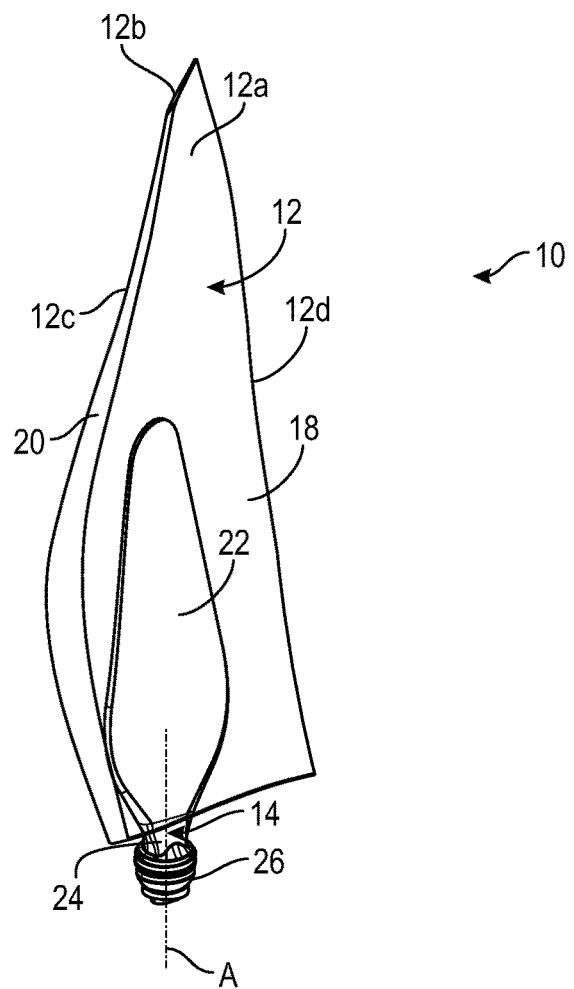
FIG. 1 is a schematic perspective view of a propeller vane for an aircraft turbine engine, and illustrates the present invention.

FIG. 1 shows a vane 10 for a propeller of an aircraft turbine engine, this propeller being either ducted or un-ducted.

The vane 10 comprises a blade 12 connected to a root 14.

The blade 12 has an aerodynamic profile and comprises an intrados 12a and an extrados 12b which are connected by an upstream leading edge 12c and a downstream trailing edge 12d, the terms upstream and downstream referring to the flowing of the gases around the blade 12 in operation.

The blade 12 has an upper end which is free, referred to as summit, and a lower end which is connected to the root 14.

In the example shown, the vane 10 is made of a composite material by an injection method referred to as RTM method (Resin Transfer Molding). This method consists of preparing a fibrous preform 18 by three-dimensional weaving, then placing this preform in a mould and injecting a polymerizable resin, such as an epoxy resin, which will impregnate the preform. After the blade 12 has cured and hardened, its leading edge 12c is usually reinforced by a metal sheath 20 which is fitted and attached, for example by gluing.

The vane 10 comprises a spar 22. The spar 22 comprises a portion forming a core of the blade 12. The portion of the spar 22 forming the core of the blade 12 is intended to be inserted into the preform 18 prior to the resin injection. The spar 22 also comprises a portion that extends on the opposite side of the summit of the blade 12 to form the root 14.

The spar 22 is preferably made of composite material. For example, it is a 3D woven carbon fibre reinforced epoxy organic matrix composite material with the warp direction predominantly radial and the weft predominantly oriented according to the chord of the blade 12 at aerodynamic duct height.

Alternatively, the spar can also be formed by a more mechanically advantageous assembly of different organic matrix composite materials (thermoset, thermoplastic or elastomer) reinforced with long fibres (carbon, glass, aramid, polypropylene) in several fibre arrangements (woven, braided, knitted, unidirectional).

Although not shown, the blade 12 may be hollow or solid and comprises an internal cavity filled with a foam or honeycomb type filler material. This filler material is installed around the spar 22 and is covered with a skin of organic matrix composite material to increase the impact resistance of the blade 12.

The sheath 20 may be titanium or titanium alloy, stainless steel, steel, aluminium, nickel, etc. The intrados 12a or even the extrados 12b of the blade 12 may be covered with a polyurethane film for the protection against erosion.

The root 14 is here without a metal annular barrel enveloping it.

The axis "A" is an axis of elongation of the vane 10 and of the blade 12 and in particular a pitch axis "A" of the vane 10, i.e. the axis about which the angular position of the vane 10 is adjusted. It is generally also a radial axis which therefore extends along a radius with respect to the axis of rotation of the propeller equipped with this vane 10.

Figure 2:
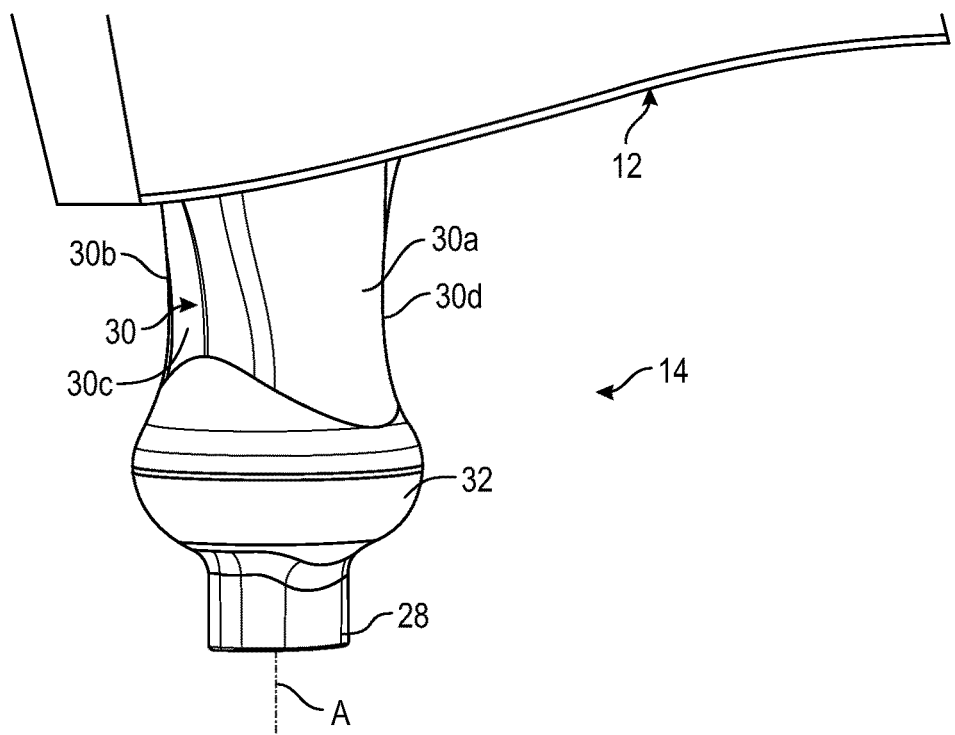
FIG. 2 is a larger scale view of a portion of FIG. 1 and shows the root of the vane.

The root 14 has a particular shape which is best seen in FIG. 2. The root 14 essentially comprises three portions:

a free lower end 28 located opposite the blade 12, an upper stilt 30 located on the side of the blade 12, and a bulged stretch, referred to as "bulb" 32, located between the free end 28 and the stilt 30.

Figure 3:
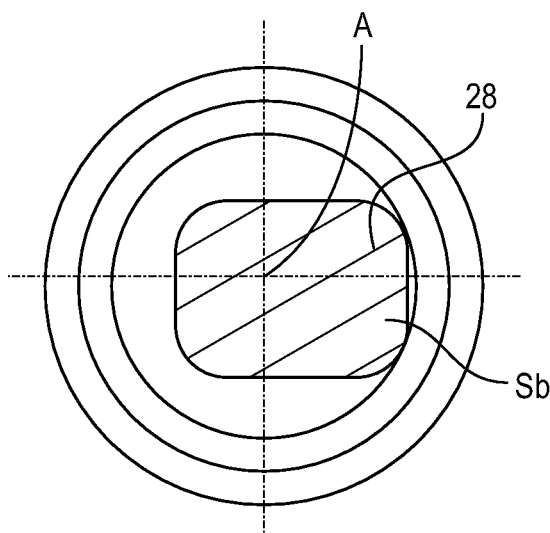
FIG. 3 is a cross-sectional view according to the sectional plane Pb of FIG. 4, which shows the shape and the position of the free lower end of the root in relation to the pitch axis.

The free end 28 has a generally parallelepiped shape in the example shown. As can be seen in FIG. 3, this free end 28 is offset from the pitch axis "A" to achieve a keying or an indexing, as will be explained in more detail below.

Figure 4:
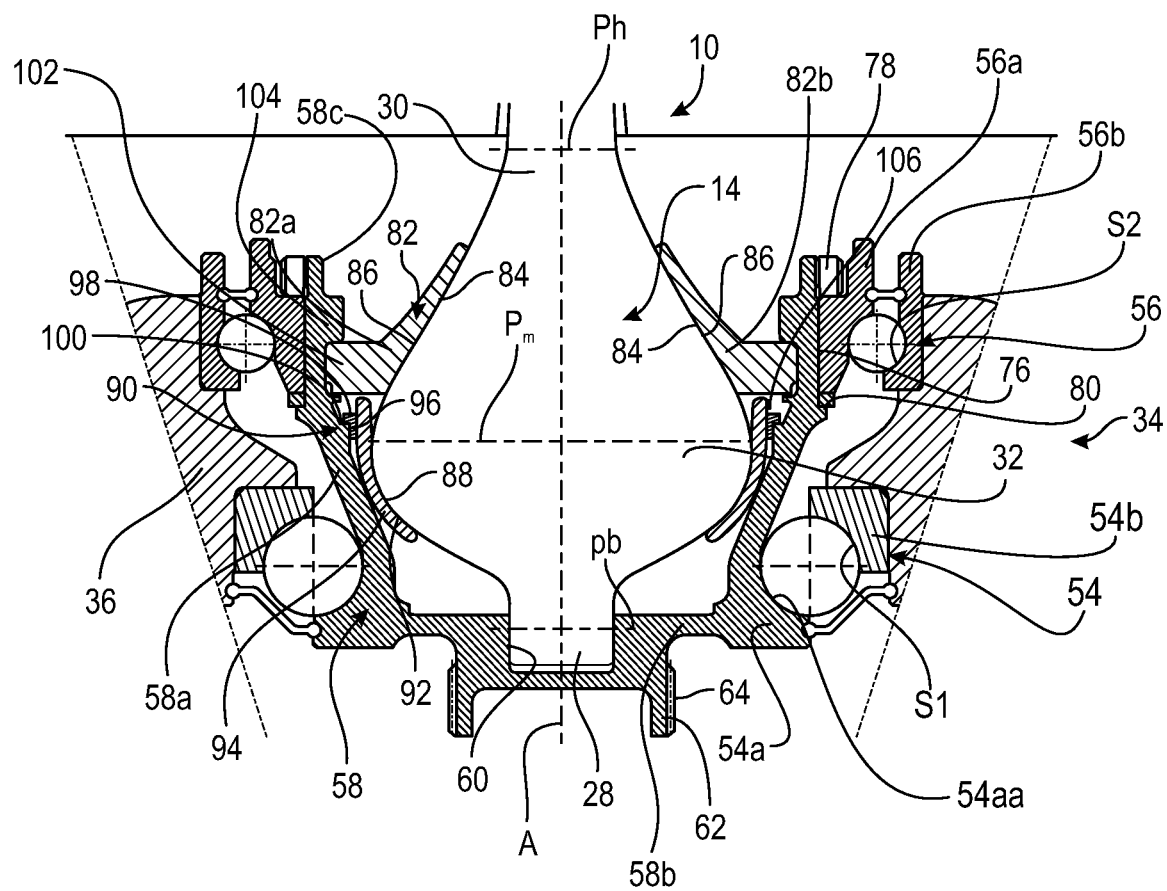
FIG. 4 is an axial cross-sectional view showing the root of the vane of FIG. 1 attached in a cup of a pitch setting system produced according to a first embodiment of the invention.

Referring to FIG. 4, Pb is defined as a transverse plane, i.e. a plane perpendicular to the pitch axis "A", passing substantially through the middle of the free end 28, measured along the pitch axis A. This plane Pb is referred to as bottom or lower plane. FIG. 3 shows the cross-sectional shape of the free end 28 in this plane Pb. This section, referred to as low section, has a value or a surface area, for example maximum, denoted Sb and is generally rectangular in shape in the example shown.

As will also be described below, the free end 28 is configured to cooperate with a pitch setting system 34 of the vane 10.

Referring again to FIG. 2, the stilt 30 has a relatively complex shape which allows to provide a transition between the root 14 and the spar portion 22 forming the core of the blade 12. The stilt 30 comprises schematically:

two lateral flanks 30a, 30b, located respectively on the side of the intrados 12a and the extrados 12b of the blade 12, which converge towards each other along the pitch axis "A" and towards the summit of the blade 12, and two edges, respectively upstream 30c and downstream 30d, which on the contrary diverge from each other along the pitch axis "A" and towards the summit of the blade 12.

With reference to FIG. 4, Ph is defined as a transverse plane passing through the stilt 30, and in particular the lower end of the stilt 30. This plane Ph is referred to as high or upper plane. In this plane, the stilt 30 may have a non-circular cross-sectional shape, for example oval, oblong, square or rectangular. This section, referred to as high section, has a value or a surface area, for example maximum, noted Sh.

The bulb 32 has a generally bulging or domed shape, this bulge or doming extending around the pitch axis A.

Pm is defined as a median plane passing through the bulb 32, and in particular in its portion of greatest cross-section, hereafter referred to as middle section, which is noted Sm. This plane Pm is referred to as mean plane. In this plane, the bulb 32 may have a circular shape in section, although this section is not limiting.

It is understood that the plane Pm is located between the planes Pb and Ph. The maximum cross-sectional dimensions of the bulb 32 decrease from the plane Pm (Sm) to the plane Ph, and from the plane Pm towards the plane Pb. It is therefore understood that Sm is greater to Sb and Sh. Furthermore, in the example shown, Sh is greater than Sb.

The vane 10 is intended to be mounted in a pitch setting system 34 which allows its angular position to be changed about the pitch axis "A" relative to a hub 36 of the propeller.

For this purpose, the pitch setting system 34 comprises bearings 54, 56. The bearings 54, 56 are here two in number and are respectively a lower bearing 54 and an upper bearing 56.

The bearings 54, 56 are of the ball rolling type. In the example shown, they have different diameters and their balls also have different diameters.

The lower bearing 54 extends substantially between the planes Pm and Pb and thus around a lower portion of the bulb 32. This lower bearing 54 has a smaller diameter than the upper bearing 56, and its balls have a larger diameter than those of the upper bearing 56.

The lower bearing 54 is also angular contact. In the example shown, the bearing points or surfaces of the balls on the raceways of their rings 54a, 54b are located on a frustoconical surface 51 which extends along the pitch axis "A" and whose largest diameter is located on the side of the summit of the vane 10.

The upper bearing 56 extends substantially between the planes Pm and Ph and thus around an upper portion of the bulb 32. The upper bearing 56 is also angular contact. In the example shown, the bearing points or surfaces of the balls on the raceways of their rings 56a, 56b are located on a frustoconical surface S2 which extends along the pitch axis "A" and the largest diameter of which is located on the side of the free end 28 of the root 14 of the vane 10.

Figure 5:
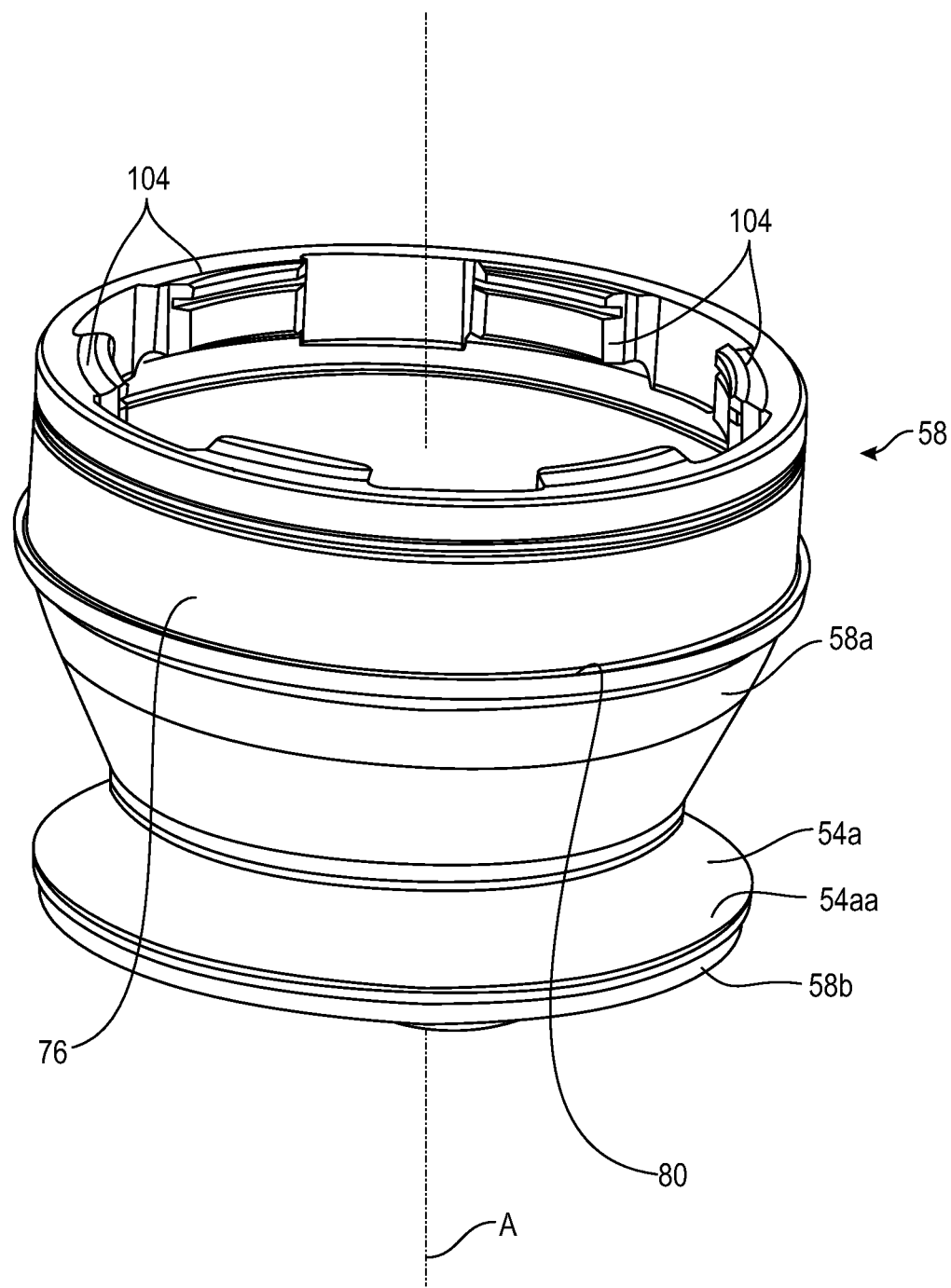
FIG. 5 is a perspective view showing the cup in FIG. 4.

FIGS. 4 and 5 illustrate an example embodiment of the pitch setting system 34.

The pitch setting system 34 comprises a cup 58. The cup 58 comprises an annular wall 58a extending around the pitch axis A. The annular wall 58a radially delimits an internal volume of the cup 58. The internal volume of the cup 58 is closed downwards by a bottom wall 58b which extends opposite the free end 28 of the root 14. The cup 58 has at its upper axial end an opening 58c which is radially delimited by an upper end edge of the annular wall 58a. The free end 28 and the bulb 32 of the root 14 are intended to be inserted axially inside the cup 58 through the upper opening 58c.

The annular wall 58a and the bottom wall 58b are produced integrally.

The bottom wall 58b is configured to cooperate in a form-fitting manner with the free end 28 of the root 14 so that the cup 58 is secured in rotation to the root 14 about the pitch axis "A" and thus constitutes a pivot for the associated vane 10.

In the present case, it is understood that the bottom wall 58b comprises a recess 60 having a non-circular, and in particular rectangular, cross-section and configured to receive the free end 28, as illustrated in FIGS. 3 and 4. As can be seen in FIG. 2, this recess 60 is eccentric with respect to the pitch axis "A" in a similar manner to the free end 28. This eccentricity allows an indexing and a keying when inserting and mounting the root 14 in the cup 58, with only one engagement position of the free end 28 in the recess 60 being possible.

The recess 60 is located on an upper or internal face of the bottom wall 58b of the cup 58, which is thus located inside the cup 58 and oriented on the side of the root 14.

The pitch setting system 34 generates a torque at the root 14 of vane 10 which counteracts the torsional moment resulting from aerodynamic and centrifugal forces. It is advantageous to insert the free end 28 directly into the recess 60, without the interposition of a fitted element, in order to directly force the rotation of the root 14. This provides a more direct force path, with the torsional moment applied directly to the root 14. The low section has dimensions strictly smaller than the maximum dimension of the middle section in order to limit the circumferential overall dimension to this height.

The position of the middle stretch, the most radially bulky section of the bulb 32, between the two bearings 54, 56, is very advantageous in terms of radial overall dimension because a portion of the bearing surface height between the middle section and the high section is located inside the cup 58, contrary to the prior art on broached attachments integrated in a pivot. This helps to reduce the radial overall dimension of the pitch setting system 34.

This allows to reduce the diameter of the lower bearing 54 which is located below the middle section. Thus, the root 14 of vane 10 can be integrated lower along the pitch axis "A", which greatly reduces the theoretical hub ratio associated with the integration of the root 14. It is known to the person skilled in the art that a low hub ratio improves the performance of the engine, in particular as it is more compact and therefore lighter. This last point is a very important advantage of the technical solution compared to the competition, which traditionally proposes barrels with cylindrical external shape.

The bottom wall 58b comprises a lower or external face, which is located on the opposite side of the root 14, and which comprises a cylindrical extension 62 extending along the pitch axis "A" and comprising an external threads or external straight splines 64 for rotational coupling of the pitch setting system 34 with a pitch change mechanism which is not illustrated and which is common to the different pitch setting systems 34 and vanes 10 of the propeller.

As can be seen in FIG. 4, the cup 58 is designed to support the bearings 54, 56 which ensure the centring and the guiding of the cup 58 about the pitch axis "A" with respect to the hub 36 of the turbine engine.

The bearings 54, 56 may form part of the pitch setting system 34. In particular, at least one of the guide bearings may have its internal ring which is integrated to the cup 58. This is the case for the lower bearing 54 which has its internal ring 54a integrated into the cup 58. In practice, this means that the cup 58 comprises a raceway 54aa at its external periphery on which the balls of the lower bearing 54 roll directly. This raceway comprises an annular surface with a concave curved section. This raceway is located at the lower end of the cup 58 and the annular wall 58a. The external ring 54b of the lower bearing 54 is attached to the hub 36, for example by shrink-fitting. Furthermore, the cup 58 is advantageously designed to apply a preload to the lower bearing 54.

The external ring 56b of the upper bearing 56 is attached to the hub 36, for example by shrink-fitting. Its internal ring 56a is engaged over and around the free upper end of the cup 58 and the annular wall 58a. This end of the annular wall 58a comprises an external cylindrical surface 76 for mounting the internal ring 56a as well as an external thread for screwing on a nut 78 intended to be axially supported on the internal ring 56a to maintain it clamped axially against an external cylindrical shoulder 80 of the cup 58.

According to the teachings of the invention, in order to axially retain the root 14 inside the cup 58, in particular against the centrifugal force, an annular retention ring 82 is provided which extends inside the cup 58, around the bulb 32. The retention ring 82 is connected to the cup 58 so as to be at least limited in axial displacement towards the opening 58c relative to the cup 58.

The retention ring 82 has an annular bearing surface face 84 directed towards the bottom of the cup 58. The bearing surface face 84 is intended to restrict the passage cross-section of the opening 58c of the cup 58 to prevent the removing of the root 14 through the opening 58c by impediment with the bulb 32. More particularly, the bearing surface face 84 is intended to be in axial contact with an upper face 86 of the bulb 32 to block the axial displacement of the bulb 32 towards the upper opening 58c.

It is also important to strongly attach the root 14 in the cup 58 to prevent any swivelling of the vane 10 relative to the cup 58 during its use. To this end, the pitch setting system 34 comprises a lower seat 88, formed by a face turned towards the opening 58c of the cup 58, by means of which the root 14 is axially supported in the cup 58 in the direction of the bottom.

The seat 88 is a separate part from the retention ring 82. At least one of the seat 88 and/or the retention ring 82 is mounted movable in axial translation with respect to the cup 58 by means of at least one clamping mechanism 90 to allow the bulb 32, here made of composite material, to be axially clamped between the seat 88 and the bearing surface face 84 of the retention ring 82. This allows to prevent an axial clearance between the bearing surface face 84 and the vane 10.

In order that such axial clearance does not occur, whatever the operating conditions of the propeller, the bulb 32 is clamped between the seat 88 and the bearing surface face 84 of the retention ring 82 with a sufficiently high pre-stress to exceed the maximum axial forces likely to be applied to the vane 10 during operation of the propeller, for example of the order of several tens of thousands of Newtons.

The retention ring 82 is made of a metallic material, such as steel, titanium or a titanium alloy such as TA6V.

The seat 88 is made of a metallic material, such as steel, titanium or a titanium alloy such as TA6V.

To ensure that the vane 10 is retained axially in the cup 58 without clearance, the bearing surface face 84 of the retention ring 82 is directly in contact with the bulb 32, without the interposition of an insert. In particular, the bearing surface face 84 of the retention ring 82 has a shape complementary to the upper face 86 of the bulb 32 to distribute the forces over a large area of the bulb 32.

To simultaneously allow the root 14 to be maintained radially in the cup 58, the upper face 86 of the bulb 32 has a generally frustoconical shape and the bearing surface face 84 has a complementary shape. The bearing surface face 84 extends, for example, generally from the median plane to the opening 58c of the cup 58. Thus, under the effect of the centrifugal force, the root 14 becomes radially centred in the bearing surface face 84. This shape therefore allows to provide a stable position of the vane 10 with respect to the pitch axis "A" during the propeller rotation.

Compared to a broached attachment, the surface area of the bearing surface face 84 is maximised by exploiting the entire circumference of the bottom of the vane 10. In a broached attachment, only two distinct surfaces of the root 14 of vane 10, respectively located on the intrados and the extrados, are supported on bearing surfaces, whereas the surfaces of the root 14 of vane 10 located on the leading edge and trailing edge are free. Also in comparison to a broached attachment, the height of the bearing surfaces in the direction of the pitch axis "A" is much greater, which also contributes to a considerable increase in their surface area. This large support surface allow to reduce the contact pressure in all operating conditions.

The inner diameter of the retention ring 82, measured at the upper end of the bearing surface face 84, is substantially smaller than the diameter of the middle section of the bulb 32. To allow it to be arranged around the bulb 32 in a simple manner, the retention ring 82 is here produced of several sectors, of which two sectors 82a, 82b are shown in FIG. 4. These sectors 82a, 82b are evenly distributed around the pitch axis A.

These sectors 82a, 82b may be circumferentially in contact with each other so that the bearing surface face 84 has a continuous annular shape.

In a variant which will be detailed later, the sectors 82a, 82b are spaced circumferentially from each other so that the bearing surface face 84 has an annular shape with discontinuities between two sectors 82a, 82b. The root 14 is supported on the seat 88 by a lower face 92 of the bulb 32. The seat 88 is thus in the form of an annular support face which extends around the pitch axis A. In particular, the seat 88 conforms the lower face 92 opposite the bulb 32, in particular to allow the contact pressure between the seat 88 and the bulb 32 to be reduced. The seat 88 is in direct contact with the root 14, here made of composite material.

To allow the bottom of the root 14 to be centred in the cup 58, the lower face 92 of the bulb 32 in contact with the seat 88 has a generally frustoconical shape, here convex, and the seat 88 has a complementary shape. Thus, the root 14 is not only axially supported towards the bottom of the cup 58, but is also maintained in position radially in the cup 58.

In a variant of the invention not shown, the seat is supported against a lower face of the free end of the root.

According to a first embodiment of the invention which is shown in FIG. 4, the seat 88 is carried by at least one insert in the cup 58. The seat 88 is thus interposed between the root 14 and the cup 58. The seat 88 is mounted movable in translation by means of at least one clamping mechanism 90.

The seat 88 is here formed by the upper face of a seat ring 94 produced integrally. The seat 88 is intended to be supported against a lower annular face of the bulb 32. In this respect, the seat 88 has a continuous annular shape centred on the pitch axis A.

The seat ring 94 carrying the seat 88 is mounted in axial support towards the bottom of the cup 58 by means of a clamping ring 96 belonging to the clamping mechanism 90. The clamping ring 96 surrounds the seat 88.

The clamping ring 96 has an external peripheral rim 98 which is supported against an annular shoulder face 100 of the cup 58. The shoulder face 100 extends radially inwardly from the annular wall 58*a* and is turned towards the opening 58*c*. This shoulder face is located slightly above the median plane Pm.

The clamping ring 96 is intended to cooperate with the seat ring 94 to clamp the seat 88 axially upwards against the bulb 32 by being supported on the shoulder face 100. For this purpose, the clamping ring 96 is secured in axial displacement to an internal thread which screws onto a complementary external thread produced on an external face of the seat ring 94.

To allow the seat 88 to be clamped against the bulb 32 by turning the clamping ring 96, one of the external thread or the external thread is blocked against rotation with respect to the cup 58.

By way of a non-limiting example, this refers to the internal thread. In this respect, the clamping ring 96 is immobilised from rotating relative to the cup 58, in particular by nesting complementary shapes between the clamping ring 96 and the cup 58, for example by means of flats or pins.

In the example shown in FIG. 4, the external thread is produced integrally with the seat 88.

In a variant not shown, the external thread is formed by a ring fitted to the seat ring and axially secured to the seat. Said ring is for example rotatably mounted around the seat ring.

Furthermore, the retention ring 82 is fitted to the cup 58. It is produced of several distinct sectors 82*a*, 82*b* which are intended to be connected axially to the cup 58 by a dog clutch device. To facilitate the insertion of the sectors 82*a*, 82*b*, the retention ring 82 is produced of at least three sectors, of which only two are shown in FIG. 4.

Thus, each sector 82*a*, 82*b* comprises at least one external dog tooth 102 configured to cooperate with complementary internal dog teeth 104 of the annular wall 58*a* of the cup 58. For example, the external dog teeth 102 each have an angular extension about the pitch axis "A" of between approximately 20 and 30°.

The internal dog teeth 104 of the cup 58 are best seen in FIG. 5. These internal dog teeth 104 are evenly spaced around the pitch axis A. There are six in the non-limiting example shown. For example, they each have an angular extension about the pitch axis "A", of between approximately 20 and 30°.

The external dog teeth 102 are complementary to the internal dog teeth 104 and are configured to cooperate by dog clutch with these internal dog teeth 104. The dog clutch is a well-known method of mounting in the aeronautical field and will be described in more detail later.

When mounting the assembly formed by the vane 10 and the pitch setting system 34, the seat ring 94 carrying the seat 88 is first inserted into the cup 58 through its upper opening 58*c*. The seat ring 94 is pre-screwed with its clamping ring 96 so that the seat 88 occupies its lowest position in the cup 58 when the ring 96 is pressed against the shoulder face 100. The seat ring 94 and its clamping ring 96 are positioned so that the rim 98 of the clamping ring 96 is supported on the shoulder face 100 of the cup 58.

Then the root 14 is inserted with its free end 28 through the upper opening 58*c* of the cup 58. The root 14 is positioned so that the bulb 32 is received against the seat 88.

Then the sectors 82*a*, 82*b* of the retention ring 82 are inserted into the cup 58 through its upper opening 58*c*. This insertion is facilitated by the fact that the seat 88 is in its lowest position. This provides a sufficient space for the insertion of the external dog teeth 102 between the internal dog teeth 104 without being impeded by the bulb 32.

The external dog teeth 102 of the sectors 82*a*, 82*b* are arranged axially coincident with the spaces angularly between the internal dog teeth 104. Then the external teeth 102 of each sector 82*a*, 82*b* are inserted axially downwards into these spaces so as to be below the level of the internal dog teeth 104. Finally, the sectors 82*a*, 82*b* are rotated about the pitch axis "A" until the external dog teeth 102 are axially in line with the internal dog teeth 104. Thus, the sectors 82*a*, 82*b* of retention ring 82 are limited in axial displacement towards the opening 58*c* by contact of their external dog teeth 102 against the internal dog teeth 104 of the cup 58.

Subsequently, the clamping mechanism 90 is operated to allow the seat 88 to be clamped axially against the bulb 32. This has the effect of raising the root 14 relative to the cup 58 towards its upper opening 58*c*, until the bulb 32 is axially supported against the bearing surface face 84 of the retention ring 82. Thus, the clamping force is transmitted from the seat 88 to the bulb 32, then from the bulb 32 to the retention ring 82, and from the retention ring 82 to the cup 58 via the dog teeth 102, 104. A reaction force takes place between the clamping ring 96 and the cup 58 via the shoulder face 100. The root 14 is thus only in direct contact with the bearing surface face 84 of the retention ring 82 and with the seat 88 of the seat ring 94.

For the actuation of the clamping mechanism 90, an interval is angularly reserved between at least two sectors 82*a*, 82*b* of retention ring 82 to allow the insertion of a clamping tool (not shown) through the upper opening 58*c*. Here, the clamping is carried out by means of a tool comprising at least one sprocket which is inserted into the cup 58. The sprocket is intended to be meshed with an external toothing 106 carried by the periphery of the seat 88. The external toothing 106 is here arranged just above the clamping ring 96.

Figure 6:
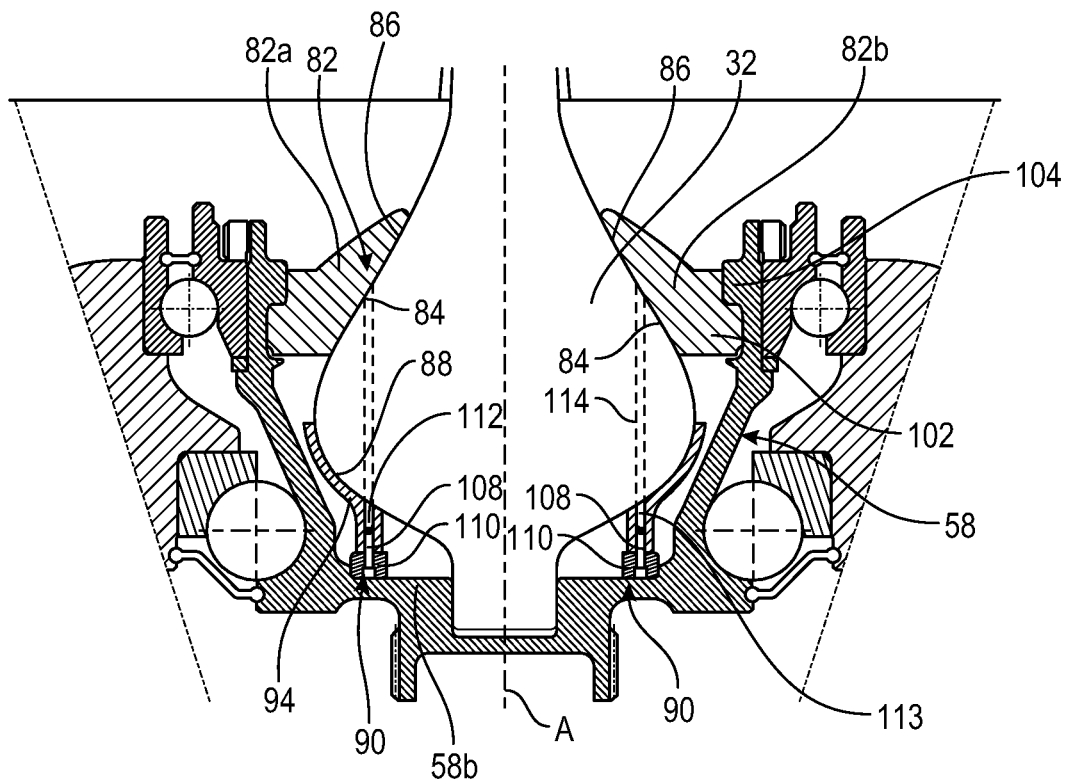
FIG. 6 is a similar view to FIG. 4, which represents a second embodiment of the invention.

A second embodiment of the invention is shown in FIG. 6. This second embodiment comprises much in common with the first embodiment. Only the mechanism 90 for clamping the seat 88 has been changed compared to the first embodiment. In the following, only those elements will be described which differ from the embodiment shown in FIG. 4.

In this variant embodiment, the seat 88 is also carried by an seat ring 94. However, the seat ring 94 is here mounted on the cup 58 by means of a plurality of clamping mechanisms 90 which are evenly distributed around the pitch axis A.

Each clamping mechanism 90 here comprises a screw 108 which is rotatably mounted in a support 110 which is supported downwards in the cup 58. The support is thus intended to be in close contact with the cup 58. The screw 108 is mounted axially stationary in the support. An axial threaded rod of the screw 108 is screwed into a threading 113 complementary of the seat 88 opening axially downwards. The lower end of the screw 108 is axially supported against a face of the cup 58 turned towards the opening 58*c*, in this case the bottom wall 58*b*, by means of the support 110.

In particular, the screw 108 is mounted axially in line with the bulb 32. To allow the screw 108 to be turned in either orientation, the upper end of the screw 108 is equipped with an indentation 112 which is capable of cooperating with a screwdriver having a complementary indentation. To allow the insertion of the screwdriver, the bulb 32 is equipped with axial orifices 114 arranged in coincidence with the threading 113 of the seat 88, said threading 113 opening axially upwards into the seat 88. In addition, the clamping mechanisms 90 are arranged so as to be angularly located between two sectors 82a, 82b of retention ring 82 to allow the screwdriver to easily access the orifices 114.

The rotation of the screws 108 thus allows the seat 88, and therefore the bulb 32, to be lifted from the cup 58 and come to clamp it against the bearing surface face 84 of the retention ring 82.

Figure 7:
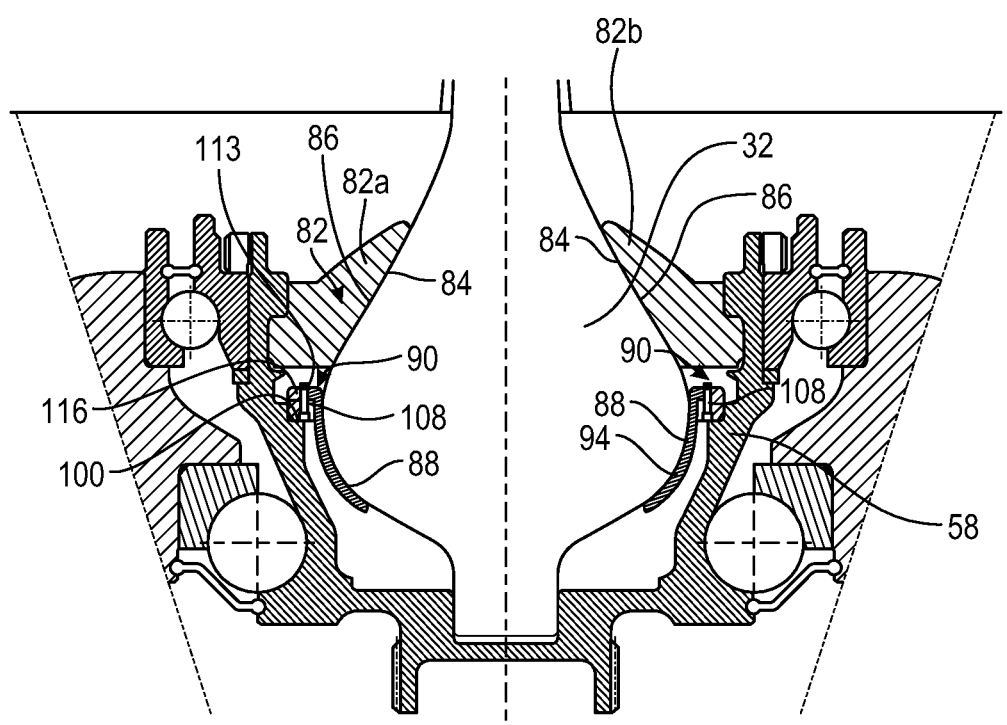
FIG. 7 is a view similar to FIG. 4 which represents a third embodiment of the invention.

A third embodiment of the invention is shown in FIG. 7. This third embodiment comprises much in common with the second embodiment. Only the positions of the clamping mechanisms 90 of the seat 88 have been changed compared to the second embodiment. In the following, only will be described the elements which differ from the embodiment shown in FIG. 6.

In this embodiment, the screws 108 of the clamping mechanisms 90 are arranged so as to cooperate with a threading 113 produced in an external peripheral rim 116 of the seat 88. Thus, the screws 108 are supported on a shoulder face 100 of the cup 58. The shoulder face 100 is here located slightly above the median plane Pm. The screws 108 are therefore not arranged axially in line with the bulb 32. This arrangement allows to avoid the need to make orifices for the passage of a tool in the bulb 32. To allow the screwdriver to pass through, the screws 108 are advantageously arranged in line with angular intervals reserved between two sectors 82a, 82b of the retention ring 82.

A fourth embodiment of the invention is shown in FIGS. 8 to 11. This embodiment is similar to the third embodiment in that the seat 88 and its clamping mechanisms 90 are similarly carried out and arranged. In the following, only the differences between this fourth embodiment and the third embodiment will be described.

Figure 8:
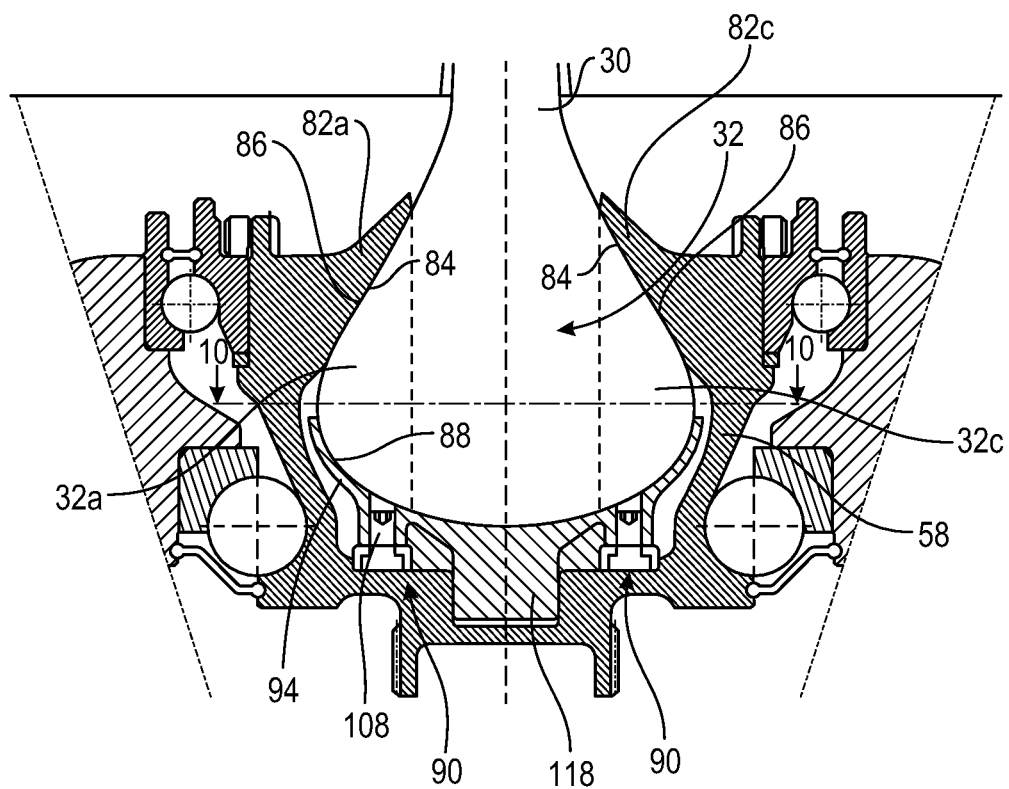
FIG. 8 is a similar view to FIG. 4, which represents a fourth embodiment of the invention.

As shown in FIG. 8, in this fourth embodiment, the retention ring 82 is produced integrally with the cup 58.

To allow the root 14 to be inserted into the cup 58 and positioned relative to the retention ring 82, it is intended that the retention ring 82 and the root 14 be shaped to allow them cooperate in a dog clutch device manner.

Figure 9:
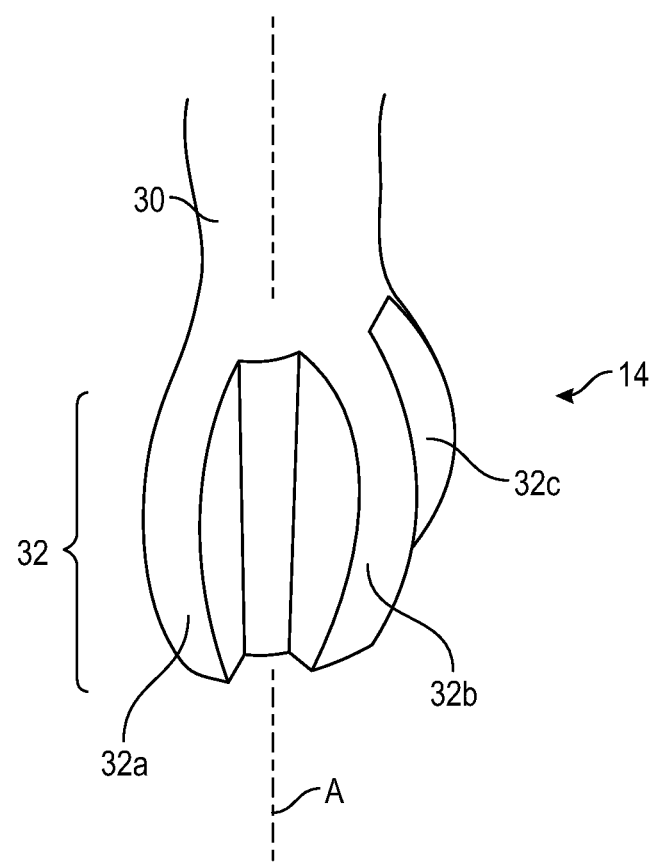
FIG. 9 is a perspective view showing the root of the vane configured to be inserted into the cup of the embodiment shown in FIG. 8.
Figure 10:
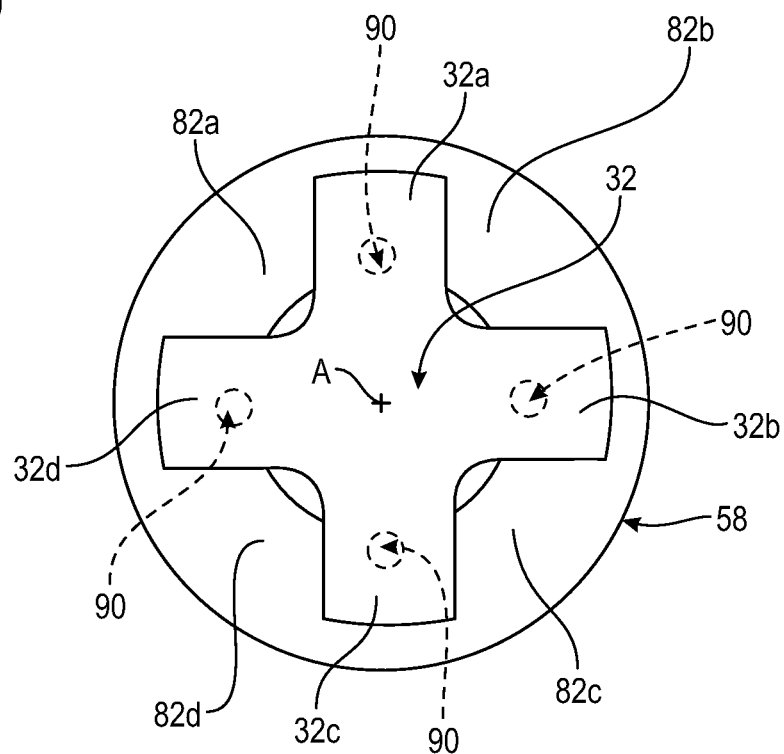
FIG. 10 is a cross-sectional view along the sectional plane 10-10 of FIG. 8, which shows the position of the vane root when inserted into the cup.
Figure 11:
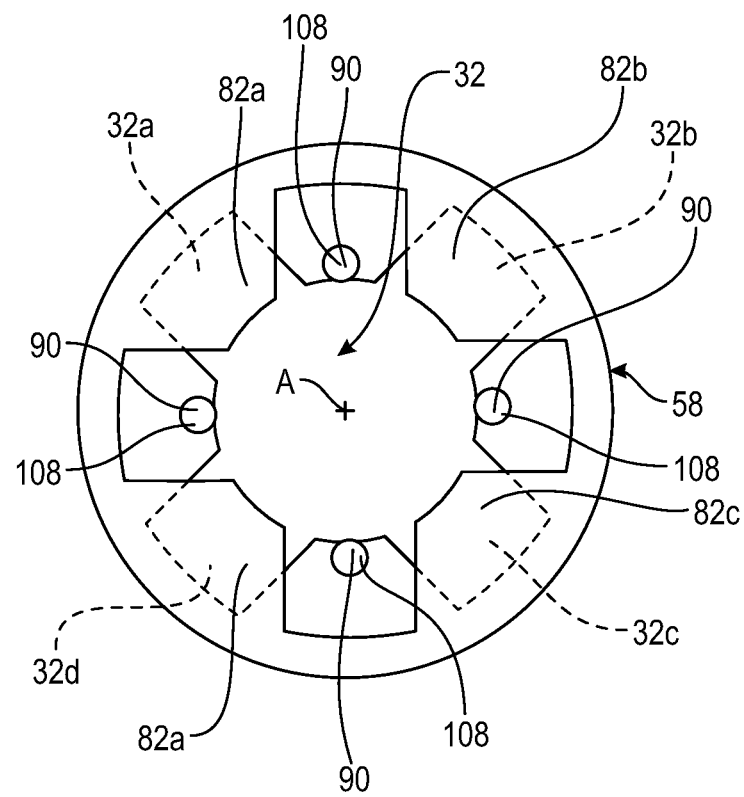
FIG. 11 is a similar view to FIG. 10, which shows the root attached under a retention ring of the cup by dog clutch.

Thus, as shown in FIGS. 9 to 11, the bulb 32 has, in cross-section, a cross-shaped profile with four branches 32a, 32b, 32c, 32d distributed at 90° and not a convex profile as was the case in the other embodiments. The retention ring 82 is divided into four sectors 82a, 82b, 82c, 82d separated angularly by intervals allowing the axial insertion of the branches of the bulb 32 into the intervals, as shown in FIG. 10.

After its insertion between the sectors 82a, 82b, 82c, 82d of the retention ring 82, the root 14 is rotated angularly about the pitch axis "A" with respect to the cup 58, in this case in a counter clockwise direction, to allow the branches 32a, 32b, 32c, 32d to be displaced axially in line with the sectors 82a, 82b, 82c, 82d. Thus, the bulb 32 is in contact with the bearing surface face 84, preventing its axial removing.

In this embodiment, the root 14 has no free lower end to allow it to pivot relative to the cup 58. It is the seat 88 that ensures the rotational connection between the cup 58 and the root 14. After clamping, the root 14 is in fact linked in rotation with the seat 88 by friction. In addition, the seat ring 94 is equipped with a central protrusion 118 which is nested into the recess 60 of the bottom of the cup 58 to ensure the rotational connection between the seat 88 and the cup 58.

Advantageously, as illustrated in FIG. 11, the screws 108 of the mechanisms 90 for clamping the seat 88 are angularly arranged between two branches of the bulb 32, and therefore between two sectors 82a, 82b, 82C, 82d of the retention ring 82, to allow the insertion of the screwdriver which will allow the clamping of the seat 88 against the bulb 32.

Figure 12:
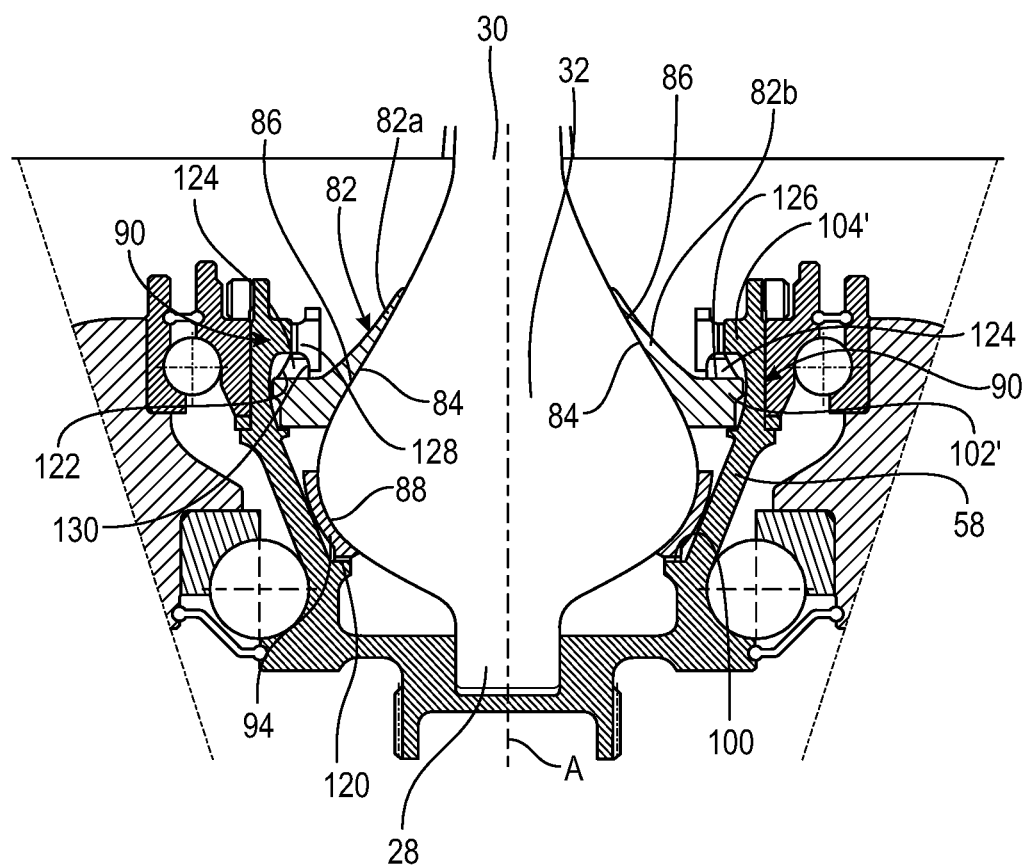
FIG. 12 is a similar view to FIG. 4, which represents a fifth embodiment of the invention.

A fifth embodiment of the invention is shown in FIG. 12. In contrast to the first four embodiments, it is here the retention ring 82 which is mounted movable in axial translation with respect to the cup 58 by means of a clamping mechanism 90, whereas the seat 88 is here stationary with respect to the cup 58.

As in the first embodiment, the retention ring 82 is produced of several distinct sectors of the cup 58, of which two sectors 82a, 82b are shown here. However, the sectors 82a, 82b are not mounted by dog clutch into the cup 58. To this end, the cup 58 comprises an internal shoulder 104' which extends continuously around the cup 58 and each sector 82a, 82b of retention ring 82 comprises a continuous external rim 102' which is intended to be received below said shoulder 104'.

Unlike the first embodiment, the seat 88 is here carried by an seat ring 94 which is mounted axially stationary in the cup 58. More particularly, the seat ring 94 is received in axial support on an annular shoulder face 100 of the annular wall 58a turned towards the upper opening 58c. To allow the height of the seat 88 to be adjusted, a shim 120 may be provided between the shoulder face 100 and the seat ring 94.

When the root 14 is received in support on its seat 88, the external rim 102' of each sector 82a, 82b of retention ring 82 is received below the internal shoulder 104' of the cup 58 with a vertical movement between a lower position in which the bearing surface faces 84 are in support on the bulb 32 and an upper position in which the external rims 102' are supported against the internal shoulder 104' of the cup 58.

In order to allow the sectors 82a, 82b of retention ring 82 to be clamped in their lower position, the clamping mechanism 90 comprises a frustoconical support face 122 connected to the cup 58, which is arranged here below the internal shoulder 104' of the cup 58. The frustoconical support face 122 is turned towards the bottom wall 58b and inwards. It converges in the direction of the upper opening 58c of the cup 58. For example, the frustoconical support face is formed by the lower face of a ring which is attached under the internal shoulder 104'.

Alternatively, not shown, the frustoconical support face 122 forms, for example, directly the lower face of the internal shoulder 104'.

The clamping mechanism 90 also comprises wedges 124 which are distributed around the retention ring 82. Each wedge 124 is interposed between the frustoconical support face 122 and a radial peripheral stop face 126 of the retention ring 82 formed here by the upper face of the rim 102'. Each wedge 124 may be formed by a seat ring segment of prismatic section, by a ball or by any other component allowing it to be supported simultaneously in a sliding manner on the frustoconical support face and on the peripheral abutment face of the retention ring 82 segments.

The clamping mechanism 90 further comprises a clamping ring 128 which is screwed into the cup 58. The clamping ring 128 surrounds the bulb 32. It has an external thread which cooperates by screwing with a complementary internal thread which is here carried by the internal end face of the internal shoulder 104'. The clamping ring 128 has a bias frustoconical annular face 130 turned outwardly and downwardly. The bias face 130 of the clamping ring 128 is arranged radially opposite the support face 122 of the cup 58. It bias each wedge 124 radially outwards towards the frustoconical support face 122 when the clamping ring 128 is screwed into the cup 58. In response, the wedges 124 are pushed axially towards the bottom of the cup 58 to cause an axial clamping of the retention ring 82 against the bulb 32. The bulb 32 is thus itself clamped against the seat 88.

In this embodiment, the clamping ring 128 is advantageously very accessible since it is arranged in the immediate vicinity of the upper opening 58c of the cup 58, without the presence of components likely to reduce its accessibility.

Figure 13:
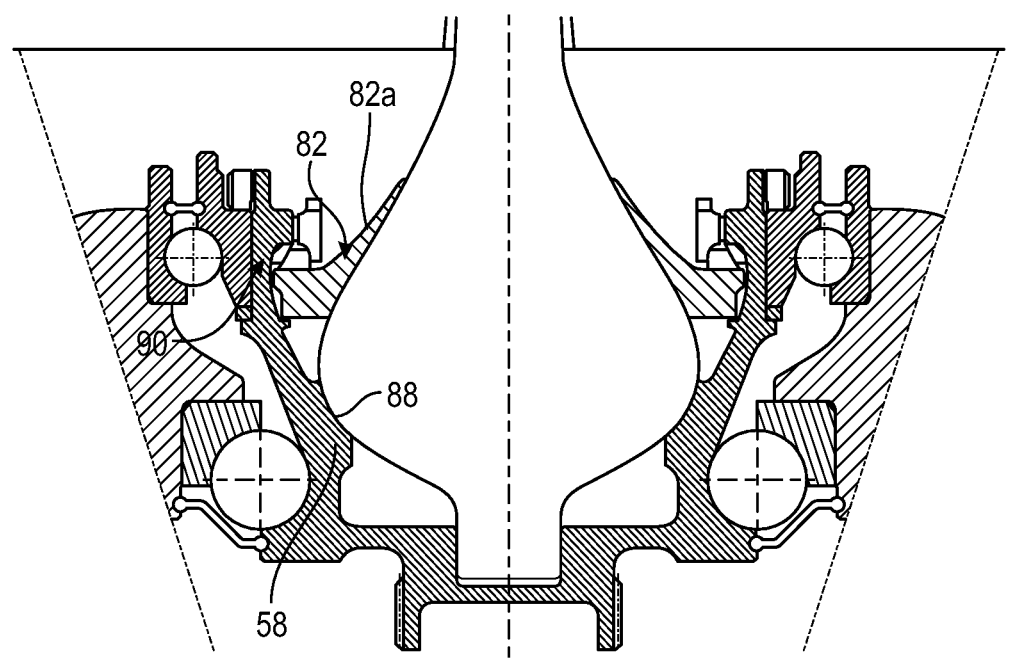
FIG. 13 is a similar view to FIG. 4, which represents a sixth embodiment of the invention.

According to an alternative embodiment of this fifth embodiment which is shown in FIG. 13, instead of being carried by an insert, the seat 88 is produced integrally with the cup 58, here with the annular wall 58a.

Of course, it is possible to combine these different embodiments, for example to obtain a pitch setting system 34 comprising a seat 88 and a retention ring 82, both of which can be movable in axial translation by means of associated clamping mechanisms.

The invention claimed is:

1. An assembly comprising a propeller vane and a system for setting the pitch of the vane, for an aircraft turbine engine, the vane having a root extending from an upper end connected to a blade of the vane to a free lower end, the root having a bulged stretch, referred to as "bulb", the system for setting the pitch of the vane about a pitch axis, wherein it comprises:
    a cup which is radially delimited by an annular wall extending around the pitch axis, the cup comprising a lower bottom enclosed by a bottom wall and an upper opening through which the bulb is intended to be inserted axially into the cup;
    an annular retention ring extending around the bulb, the retention ring being at least limited in axial displacement towards the opening with respect to the cup, the retention ring having an annular bearing surface face which restricts the passage cross-section of the opening and which is intended to be in axial contact with an upper face of the bulb to block the axial displacement of the root towards the opening;
    a lower seat carried by a part separate from the retention ring by means of which the root is axially supported in the cup in the direction of the bottom, the seat and/or the retention ring being mounted movable in axial translation with respect to the cup by means of at least one clamping mechanism in order to allow the axial clamping of the bulb between the seat and the bearing surface face of the retention ring.

2. The assembly according to claim 1, wherein the bearing surface face of the retention ring is directly in contact with the bulb and the seat is directly in contact with the root.

3. The assembly according to claim 1, wherein the bearing surface face of the retention ring has a shape complementary to that of the upper face of the bulb, and/or in that the upper face of the bulb has a generally frustoconical shape.

4. The assembly according to claim 3, wherein the retention ring is produced of several sectors.

5. The assembly according to claim 1, wherein the bottom wall is configured to cooperate in a form-fitting manner with a free end of the root so that the cup is secured in rotation with the root about the pitch axis.

6. The assembly according to claim 1, wherein the pitch setting system further comprises:
    a lower rolling guide bearing extending around the pitch axis and mounted around a lower portion of the annular wall,
    an upper rolling guide bearing extending around the pitch axis and mounted around an upper portion of the annular wall.

7. The assembly according to claim 1, wherein the seat is mounted movable in axial translation in the cup by means of at least one clamping mechanism.

8. The assembly according to claim 7, wherein each clamping mechanism is formed by an axial screw which is received in a threading complementary of the seat, a lower end of the screw being supported axially against a face of the cup turned towards the opening.

9. The assembly according to claim 7, wherein the clamping mechanism is formed by an annular clamping ring which surrounds the seat and which is in axial support against an annular face of the cup turned towards the opening, the clamping ring comprising an internal thread cooperating with an annular external thread which is axially secured to the seat, one of the external thread or the clamping ring being blocked in rotation with respect to the cup.

10. The assembly according to claim 9, wherein the external thread is produced integral with a seat ring carrying the seat.

11. The assembly according to claim 1, wherein the retention ring is mounted movable in axial translation in the cup by means of at least one clamping mechanism.

12. The assembly according to claim 11, wherein the clamping mechanism comprises wedges which are distributed around the retention ring and which are interposed between a frustoconical face for supporting the annular wall of the cup turned towards the bottom and a peripheral stop face of the retention ring.

13. The assembly according to claim 12, wherein the clamping mechanism comprises a clamping ring which is screwed into the cup and which has a frustoconical annular face which bias the wedge in order to cause an axial clamping towards the bottom of the cup of the retention ring against the bulb.

14. The assembly according to claim 7, wherein the retention ring is equipped on its periphery with external dog teeth which cooperate with complementary internal dog teeth of the annular wall of the cup in order to block the axial displacement of the retention ring towards the opening.

15. The assembly according to claim 7, wherein the retention ring is produced integrally with the cup.

16. The assembly according to claim 11, wherein the seat is mounted axially stationary with respect to the cup.

17. The assembly according to claim 16, wherein a setting shim is interposed axially between the cup and the seat.

18. The assembly according to claim 16, wherein the seat is produced integrally with the cup.

* * * * *